United States Patent Office 3,528,886
Patented Sept. 15, 1970

3,528,886
PROCESS FOR HALOGENATING STEROIDS
Saul L. Niedleman, Lawrence Township, and Seymour D. Levine, North Brunswick, N.J., assignors to E. R. Squibb & Sons, Inc., New York, N.Y., a corporation of Delaware
No Drawing. Filed Dec. 18, 1967, Ser. No. 691,157
Int. Cl. C07c 167/00
U.S. Cl. 195—51                    4 Claims

ABSTRACT OF THE DISCLOSURE

The disclosure relates to a microbiological process for preparing bromohydrin steroids from those that are unsaturated in the 9(11)-position. The holo steroids formed are useful as anabolic agents if of the androstane series and progestational agents if of the pregnane series.

---

The present invention provides a method of brominating in the nine-position and simultaneously hydroxylating in the eleven-position under relatively mild conditions and within a reasonable length of time.

In general, the process of the present invention comprises subjecting a steroid that is unsaturated in the 9(11)-position to the action of a microorganism of the genus Caldariomyces in the presence of a brominating agent. The product which is recovered from this process is the corresponding bromohydrin steroid.

The formation of bromohydrins utilizing the method of this invention may be represented by the following reaction:

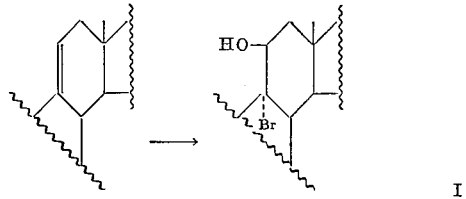

I

In this reaction the $\Delta^{9(11)}$ steroid (I) typified by 9(11)-dehydroprogesterone is subjected to the microorganism Caldariomyces fumago or the enzymes thereof in the presence of potassium bromide as the brominating agent.

Examples of steroids having the structure of Formula I which may be utilized in the practice of the invention are $\Delta^{9(11)}$-testosterone; 17$\alpha$-methyl-$\Delta^{9(11)}$-testosterone; 4$\alpha$-chloro-$\Delta^{9(11)}$-testosterone; 4$\alpha$-chloro-17$\alpha$-methyl - $\Delta^{9(11)}$-testosterone; 7$\alpha$,17$\alpha$ - dimethyl-$\Delta^{9(11)}$-testosterone; 17$\alpha$-ethyl - $\Delta^{9(11)}$-19 - nortestosterone; $\Delta^{9(11)}$-progesterone - 20 ethylene ketal; $\Delta^{9(11)}$-deoxycorticosterone-20-ethylene ketal; $\Delta^{9(11)}$-hydrocortisone - 20 - ethylene ketal; 7$\alpha$-cyano-17$\alpha$ - ethynyl - $\Delta^{9(11)}$ - testosterone; $\Delta^{6,9(11)}$ - 6 - chloro-17$\alpha$ - acetoxyprogesterone; $\Delta^{9(11)}$ - 17$\alpha$-ethynyl - 19 - nortestosterone; $\Delta^{9(11)}$ - 6$\alpha$ - methyl - 17$\alpha$ - acetoxyprogesterone; $\Delta^{9(11)}$ - 5$\beta$-A-norandrostene -17$\beta$ - ol-3-one; $\Delta^{9(11)}$-5$\alpha$ - A - norandrosten -17$\beta$ - ol-3-one; $\Delta^{9(11)}$-A-nortestosterone; and $\Delta^{9(11)}$ - 7$\alpha$-amino-17$\alpha$-ethynyltestosterone.

The microorganism can be grown as a static culture on Czapek-Dox medium at room temperature for five to seven days by methods known to the art. The mycelial pads are collected and stored in a deep-freeze for subsequent use. The halogenating enzyme is prepared as a supernatant from an aqueous homogenate of the mycelial pads of the microorganism.

In addition to the halogenating enzyme, hydrogen peroxide is preferably present in the reaction mixture. Although hydrogen peroxide itself may be added to the mixture, the hydrogen peroxide may be prepared in situ by use of a peroxide producing enzyme system. Such enzyme systems are well known in the art and include glucose oxidase in the presence of glucose, D- and L-amino acid oxidases in the presence of D- or L-methionine, and diamine oxidase in the presence of histamine. Although substantially any concentration of hydrogen peroxide may be used, preferably the hydrogen peroxide is present in a molar ratio of about 0.1 to 1 to about 100 to 1 (optimally about 1 to 1 to about 10 to 1) based on the weight of the steroid. If a peroxide producing enzyme system is used, the concentration of the enzyme is so adjusted to yield the same concentration of hydrogen peroxide as stated above.

The reaction is preferably conducted at a pH in the range of about 2.2 to about 6 (optimally about 2.2 to about 4 and most advantageously at pH 3.0 in the presence of hydrogen peroxide and about 4 to about 6, most advantageously at pH 5 in the presence of enzymatically produced hydrogen peroxide). To assure that the pH of the reaction mixture is maintained in this range, a buffering agent which buffers in the desired pH range is preferably also added to the reaction medium. Suitable buffers include McIlvaine's buffer, potassium citrate buffer, sodium acetate buffer, potassium phosphate buffer and potassium formate buffer.

The reaction is carried out in an aqueous medium under aerobic conditions, normally at a temperature in the range of about 20° C. to about 30° C. The components of the medium, namely, the steroid, buffering agent, halogenating enzyme, and hydrogen peroxide source are merely mixed with water and the resultant mixture agitated or shaken to assure adequate aeration for about ten to about two hundred minutes (optimally about thirty minutes to about 120 minutes).

Among the utilizable brominating agents are the alkali metals, such as sodium bromide or potassium bromide. The salts are preferably present in excess of the stoichiometric amount required.

The bromo steroids of this invention are physiologically active substances that possess glucocorticoid activity and hence can be used in the treatment of conditions for which hydrocortisone is used. Generally, the compounds prepared in accordance with the invention may be utilized as emulsifying agents.

The following examples illustrate the invention (all temperatures being in centigrade):

EXAMPLE 1

9$\alpha$-bromo-11$\beta$-hydroxyprogesterone

To 300 ml. of a Caldariomyces fumago ATCC 11925 (American Type Culture Collection, Rockville, Md.) halogenating enzyme solution, prepared by grinding 6 mycelial pads of the organism with 60 g. of acid-washed sand and 30 ml. distilled water in a Waring Blendor for two minutes, then centrifuging, are added 60 ml. 0.3% hydrogen peroxide, 300 mg. potassium bromide in 60 ml. water, 120 ml. 0.3 M potassium phosphate buffer (pH 3.0), 500 mg. of 9(11)-dehydroprogesterone in 24 ml. of dimethylsulfoxide, and 36 ml. distilled water. The mixture is distributed in 200 ml. aliquots among three 500 ml. Erlenmeyer flasks and placed on a rotary shaker at 25° C. for fifteen minutes. The mixture is then treated with chloroform (120 ml.) and filtered through Hy-flo.

The mixture is treated with chloroform (200 ml.) and filtered through Hy-flo. The chloroform layer of the filtrate is separated and the aqueous phase extracted with chloroform (3× 500 ml.). The combined chloroform layers are dried over sodium sulfate and evaporated to dryness. The residue is plate chromatographed on neutral alumina using chloroform as the developing solvent to give two major bands detectable with ultraviolet light. Elution of the less polar band and evaporation gives 234 mg. of a semisolid which is slightly impure starting material. Elution and evaporation of the more polar band gives a residue which is crystallized from ethyl acetate-isopropyl ether to give 171 mg. of 9α-bromo-11β-hydroxyprogesterone, M.P. 148 d., $$\tau_{CDCl_3}^{TMS}\ 9.07\,(s.,\ 18\text{-Me})$$

8.24 (s., 19-Me), 7.87 (s., 21-Me), 5.37 (m., 11α-H) and 4.26 (s., 4-H).

EXAMPLE 2

9α-bromo-11β-hydroxytestosterone

Following the procedure of Example 1 but utilizing $\Delta^{9(11)}$-testosterone in lieu of $\Delta^{9(11)}$-dehydroprogesterone, the product, 9α-bromo-11β-hydroxytestosterone, is recovered from the reaction mixture.

EXAMPLE 3

9α-bromo-11β-hydroxy-17α-methyltestosterone

Following the procedure of Example 1 but utilizing 17α-methyl-$\Delta^{9(11)}$-testosterone in lieu of $\Delta^{9(11)}$-dehydroprogesterone, the product, 9α-bromo-11β-hydroxy-17α-methyltestosterone, is recovered from the reaction mixture.

EXAMPLE 4

4α-chloro-9α-bromo-11β-hydroxytestosterone

Following the procedure of Example 1 but utilizing 4α-chloro-$\Delta^{9(11)}$-testosterone in lieu of $\Delta^{9(11)}$-dehydroprogesterone, the product, 4α-chloro-9α-bromo-11β-hydroxytestosterone, is recovered from the reaction mixture.

EXAMPLE 5

4α-chloro-9α-bromo-11β-hydroxy-17α-methyltestosterone

Following the procedure of Example 1 but utilizing 4α-chloro-17α-methyl-$\Delta^{9(11)}$-testosterone in lieu of $\Delta^{9(11)}$-dehydroprogesterone, the product, 4α-chloro-9α-bromo-11β-hydroxy-17α-methyltestosterone, is recovered from the reaction mixture.

EXAMPLE 6

9α-bromo-11β-hydroxy-7α,17α-dimethyltestosterone

Following the procedure of Example 1 but utilizing 7α,17α-dimethyl-$\Delta^{9(11)}$-testosterone in lieu of $\Delta^{9(11)}$-dehydroprogesterone, the product, 9α-bromo-11β-hydroxy-7α,17α-dimethyltestosterone, is recovered from the reaction mixture.

EXAMPLE 7

9α-bromo-11β-hydroxy-17α-ethyl-19-nortestosterone

Following the procedure of Example 1 but utilizing 17α-ethyl-$\Delta^{9(11)}$-19-nortestosterone in lieu of $\Delta^{9(11)}$-dehydroprogesterone, the product, 9α-bromo-11β-hydroxy-17α-ethyl-19-nortestosterone, is recovered from the reaction mixture.

EXAMPLE 8

9α-bromo-11β-hydroxyprogesterone-20-ethylene ketal

Following the procedure of Example 1 but utilizing $\Delta^{9(11)}$-progesterone-20-ethylene ketal in lieu of $\Delta^{9(11)}$-dehydroprogesterone, the product, 9α-bromo-11β-hydroxyprogesterone-20-ethylene ketal, is recovered from the reaction mixture.

EXAMPLE 9

9α-bromocorticosterone-20-ethylene ketal

Following the procedure of Example 1 but utilizing $\Delta^{9(11)}$-deoxycorticosterone-20-ethylene ketal in lieu of $\Delta^{9(11)}$-dehydroprogesterone, the product, 9α-bromocorticosterone-20-ethylene ketal, is recovered from the reaction mixture.

EXAMPLE 10

9α-bromohydrocortisone-20-ethylene ketal

Following the procedure of Example 1 but utilizing $\Delta^{9(11)}$-hydrocortisone-20-ethylene ketal in lieu of $\Delta^{9(11)}$-dehydroprogesterone, the product, 9α-bromohydrocortisone-20-ethylene ketal, is recovered from the reaction mixture.

EXAMPLE 11

9α-bromo-7α-cyano-11β-hydroxy-17α-ethynyltestosterone

Following the procedure of Example 1 but utilizing 7α-cyano-17α-ethynyl-$\Delta^{9(11)}$-testosterone in lieu of $\Delta^{9(11)}$-dehydroprogesterone, the product, 9α-bromo-7α-cyano-11β-hydroxy-17α-ethynyltestosterone, is recovered from the reaction mixture.

EXAMPLE 12

$\Delta^6$-6-chloro-9α-bromo-11β-hydroxy-17α-acetoxyprogesterone

Following the procedure of Example 1 but utilizing $\Delta^{6,9(11)}$-6-chloro-17α-acetoxyprogesterone in lieu of $\Delta^{9(11)}$-dehydroprogesterone, the product, $\Delta^6$-6-chloro-9α-bromo-11β-hydroxy-17α-acetoxyprogesterone, is recovered from the reaction mixture.

EXAMPLE 13

9α-bromo-11β-hydroxy-17α-ethynyl-19-nortestosterone

Following the procedure of Example 1 but utilizing 17α-ethynyl-19-nortestosterone in lieu of $\Delta^{9(11)}$-dehydroprogesterone, the product, 9α-bromo-11β-hydroxy-17α-ethynyl-19-nortestosterone, is recovered from the reaction mixture.

EXAMPLE 14

6α-methyl-9α-bromo-11β-hydroxy-17α-acetoxyprogesterone

Following the procedure of Example 1 but utilizing $\Delta^{9(11)}$-6α-methyl-17α-acetoxyprogesterone in lieu of $\Delta^{9(11)}$-dehydroprogesterone, the product, 6α-methyl-9α-bromo-11β-hydroxy-17α-acetoxyprogesterone, is recovered from the reaction mixture.

EXAMPLE 15

9α-bromo-11β-hydroxy-5β-A-norandrostane-17β-ol-3-one

Following the procedure of Example 1 but utilizing $\Delta^{9(11)}$-5β-A-norandrostene-17β-ol-3-one in lieu of $\Delta^{9(11)}$-dehydroprogesterone, the product, 9α-bromo-11β-hydroxy-5β-A-norandrostane-17β-ol-3-one, is recovered from the reaction mixture.

EXAMPLE 16

9α-bromo-11β-hydroxy-5α-A-norandrostan-17β-ol-3-one

Following the procedure of Example 1 but utilizing $\Delta^{9(11)}$-5α-A-norandrosten-17β-ol-3-one in lieu of $\Delta^{9(11)}$-dehydroprogesterone, the product, 9α-bromo-11β-hydroxy-5α-A-norandrostan-17β-ol-3-one, is recovered from the reaction mixture.

EXAMPLE 17

9α-bromo-11β-hydroxy-A-nortestosterone

Following the procedure of Example 1 but utilizing $\Delta^{9(11)}$-A-nortestosterone in lieu of $\Delta^{9(11)}$-dehydroprogesterone, the product, 9α-bromo-11β-hydroxy-A-nortestosterone, is recovered from the reaction mixture.

EXAMPLE 18

9α-bromo-11β-hydroxy-7α-amino-17α-ethynyltestosterone

Following the procedure of Example 1 but utilizing $\Delta^{9(11)}$-7α-amino-17α-ethynyltestosterone in lieu of $\Delta^{9(11)}$-dehydroprogesterone, the product, 9α-bromo-11β-hydroxy-7α-amino-17α-ethynyltestosterone, is recovered from the reaction mixture.

The invention may be variously otherwise embodied within the scope of the appended claims.

What is claimed is:

1. A process for preparing a 9α-bromo-11β-hydroxy steroid, which comprises subjecting a $\Delta^{9(11)}$ steroid to the action of a microorganism of the species *Caldariomyces fumago* in the presence of a brominating agent and recovering the 9α-bromo-11β-hydroxy steroid.

2. A process in accordance with claim 1 wherein the $\Delta^{9(11)}$ steroid is selected from the group consisting of $\Delta^{9(11)}$-dehydroprogesterone; 17α - methyl - $\Delta^{9(11)}$-testosterone; 4α-chloro-$\Delta^{9(11)}$-testosterone; 4α-chloro-17α-methyl-$\Delta^{9(11)}$-testosterone; 7α,17α - dimethyl - $\Delta^{9(11)}$-testosterone; 17α-ethyl-$\Delta^{9(11)}$-19-nortestosterone; $\Delta^{9(11)}$ - progesterone-20-ethylene ketal; $\Delta^{9(11)}$-deoxycorticosterone-20-ethylene ketal; $\Delta^{9(11)}$-hydrocortisone-20-ethylene ketal; 7α-cyano-17α-ethynyl-$\Delta^{9(11)}$-testosterone; $\Delta^{6,9(11)}$ - 6 - chloro - 17α-acetoxyprogesterone; $\Delta^{9(11)}$ - 17α-ethynyl-19-nortestosterone; $\Delta^{9(11)}$-6α-methyl-17α-acetoxyprogesterone; $\Delta^{9(11)}$-5β-A-norandrostene-17β-ol-3-one; $\Delta^{9(11)}$-5α-A-norandrosten-17β - ol - 3 - one; $\Delta^{9(11)}$-A-nortestosterone; and $\Delta^{9(11)}$-7α-amino-17α-ethynyltestosterone.

3. A process in accordance with claim 1 wherein the $\Delta^{9(11)}$-steroid is $\Delta^{9(11)}$-dehydroprogesterone.

4. A process in accordance with claim 1 wherein the $\Delta^{9(11)}$ steroid is subjected to the action of a microorganism of the species *Caldariomyces fumago* in the presence of a brominating agent and hydrogen peroxide.

References Cited
UNITED STATES PATENTS 3,365,467   1/1968   Diassi et al. _____ 195—51

ALVIN E. TANENHOLTZ, Primary Examiner